United States Patent [19]
Pla et al.

[11] Patent Number: 5,382,134
[45] Date of Patent: Jan. 17, 1995

[54] ACTIVE NOISE CONTROL USING NOISE SOURCE HAVING ADAPTIVE RESONANT FREQUENCY TUNING THROUGH STIFFNESS VARIATION

[75] Inventors: Frederic G. Pla, Schenectady; Harindra Rajiyah, Clifton Park; Anthony A. Renshaw, Albany; Robert A. Hedeen, Clifton Park, all of N.Y.

[73] Assignee: General Electric Company, Schenectady, N.Y.

[21] Appl. No.: 143,602

[22] Filed: Nov. 1, 1993

[51] Int. Cl.⁶ ............................................. F01D 25/00
[52] U.S. Cl. .................................... 415/119; 381/71; 244/1 N; 340/388.1
[58] Field of Search ................ 415/118, 119; 181/206; 381/64, 71; 244/1 N; 340/388.1, 388.3

[56] References Cited

U.S. PATENT DOCUMENTS

| | | |
|---|---|---|
| 4,044,203 | 8/1977 | Swinbanks . |
| 4,689,821 | 8/1987 | Salikuddin et al. . |
| 4,700,177 | 10/1987 | Nakashima et al. . |
| 4,715,559 | 12/1987 | Fuller . |
| 4,947,356 | 8/1990 | Elliott et al. . |
| 4,947,434 | 8/1990 | Ito . |
| 5,031,222 | 7/1991 | Takaya . |

FOREIGN PATENT DOCUMENTS 58-7999 1/1983 Japan .

OTHER PUBLICATIONS

Elliott et al., "A Multiple Error LMS Algorithm and Its Application to the Active Control of Sound and Vibration," IEEE Transactions on Acoustics, Speech, and Signal Processing, vol. ASSP-35, No. 10, Oct. 1987, pp. 1423-1434.

*Primary Examiner*—Edward K. Look
*Assistant Examiner*—Jamer A. Larson
*Attorney, Agent, or Firm*—Patrick R. Scanlon; Paul R. Webb, II

[57] ABSTRACT

A noise source for an aircraft engine active noise cancellation system in which the resonant frequency of a noise radiating element is tuned to permit noise cancellation over a wide range of frequencies. The resonant frequency of the noise radiating element is tuned by a plurality of force transmitting mechanisms which contact the noise radiating element. Each one of the force transmitting mechanisms includes an expandable element and a spring in contact with the noise radiating element so that excitation of the element varies the spring force applied to the noise radiating element. The elements are actuated by a controller which receives input of a signal proportional to displacement of the noise radiating element and a signal corresponding to the blade passage frequency of the engine's fan. In response, the controller determines a control signal which is sent to the elements and causes the spring force applied to the noise radiating element to be varied. The force transmitting mechanisms can be arranged to either produce bending or linear stiffness variations in the noise radiating element.

26 Claims, 3 Drawing Sheets

ACTIVE NOISE CONTROL USING NOISE SOURCE HAVING ADAPTIVE RESONANT FREQUENCY TUNING THROUGH STIFFNESS VARIATION

BACKGROUND OF THE INVENTION

The U.S. Government has rights in this invention as provided for by the terms of contract No. NAS3-26617 awarded by the National Aeronautics and Space Administration (NASA).

CROSS REFERENCES TO RELATED APPLICATIONS

This application is related to the following copending applications: "Active Noise Control Using Noise Source Having Adaptive Resonant Frequency Tuning Through Stress Variation," Ser. No. 08/143,605, "Active Noise Control Using Noise Source Having Adaptive Resonant Frequency Tuning Through Variable Panel Loading," Ser. No. 08/143,604, and "Active Noise Control Using Noise Source Having Adaptive Resonant Frequency Tuning Through Variable Ring Loading," Ser. No. 08/143,603. All of these related copending applications are filed concurrently herewith and assigned to the same assignee as the present invention.

This invention relates generally to reducing aircraft engine noise with a cancellation noise field which is generated by vibrational inputs to noise radiating structures and more particularly concerns changing the boundary conditions of the noise radiating structures to produce adaptive tuning of the resonant frequency of the structures.

Excessive noise has always been a problem confronting the aviation industry. Noise from discrete tones generated by the fans and turbines of modern aircraft engines is a major source of the noise problems. This is particularly true in communities surrounding airports which are subjected to the noise of take off and landing operations. Lately, fan and turbine noise has become an even larger issue due to the louder fan noise of the large-thrust high bypass engines and the increased enactment and enforcement of strict community anti-noise regulations.

Turbine and fan noise has been addressed for many years by employing passive techniques such as noise absorbing liners, tuned resonators, or a combination thereof. Such devices are usually mounted at the inlet and outlet of the engine to reduce noise radiated from the engine. Some disadvantages associated with these passive techniques include added weight and decreased thrust. Also, absorbent liners are generally ineffective against the long wavelengths of low frequency noise, and tuned resonators are only useful at the frequency to which they are tuned.

One possible active approach to fan and turbine noise control is to cancel the noise using secondary or cancelling noise fields generated with acoustical inputs. The cancelling noise field, which is of equal amplitude but 180° out-of-phase with the primary field, destructively interferes with and cancels the primary field. However, standard acoustical inputs, such as loudspeakers, are expensive, fragile, heavy and require a relatively large amount of power. An alternative to acoustical inputs is disclosed in the copending application entitled "Active Control of Aircraft Engine Noise Using Vibrational Inputs," Ser. No. 08/051,810, filed Apr. 21, 1993 which is a File Wrapper Continuation of application Ser. No. 07/787,471, filed Nov. 4, 1991 and assigned to the same assignee as the present invention. Application Ser. No. 08/051,810 discloses using piezoceramic actuators instead of acoustical inputs to generate the cancelling noise field. The actuators are mounted either directly to an inner surface of an aircraft engine or to noise radiating elements resiliently mounted to the inner surface. When excited, the actuators produce vibrations in their supporting structure (the noise radiating elements or the engine itself) which "shake" the structure so that it generates the cancelling noise field.

The supporting structure which is shaken by the piezoceramic actuators may be made of low-damping materials because the peak vibratory response at resonance of elements fabricated with low-damping materials is very high and produces a correspondingly high acoustic output which is needed to cancel the engine noise. However, the off-resonance vibratory response of elements fabricated with low-damping materials is very low and does not result in an acoustic output sufficient to cancel engine noise. Thus, such piezoceramic-actuated noise cancellation is only effective over a narrow frequency range. Cancellation of aircraft engine noise is often required over a wider range of frequencies.

Accordingly, there is a need for an active noise cancellation system which is effective over a wide frequency range.

SUMMARY OF THE INVENTION

The above-mentioned needs are met by the present invention in which the cancelling sound field is generated using noise radiating elements which are vibrated by actuators mounted thereon. To accomplish noise cancellation over a wide range of frequencies, the structural resonant frequency of the noise radiating elements is tuned by adaptively changing their boundary conditions. Changing an element's boundary conditions (such as torsional or linear stiffness, or compressive or tensile loading) will alter its resonant frequency.

Specifically, the present invention provides a noise source for an active noise cancellation system which comprises a noise radiating element mounted to the outer shroud of an aircraft engine by a number of clamps and having an actuator disposed thereon. The resonant frequency of the noise radiating element is tuned by a plurality of force transmitting mechanisms which contact the noise radiating element. Each one of the force transmitting mechanisms comprises an expandable element and a spring in contact with the noise radiating element so that excitation of the element varies the spring force applied to the noise radiating element.

The elements are actuated by a controller which receives input of a feedback signal proportional to displacement of the noise radiating element and a signal corresponding to the blade passage frequency of the engine's fan. In response, the controller determines a control signal which is sent to the elements and causes the spring force applied to the noise radiating element to be varied. The force transmitting mechanisms are preferably attached to the clamps which support the noise radiating element. These mechanisms can either engage flanges extending from the noise radiating element so as to produce a torsional force in the noise radiating element or engage the noise radiating element directly to produce a linear force.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
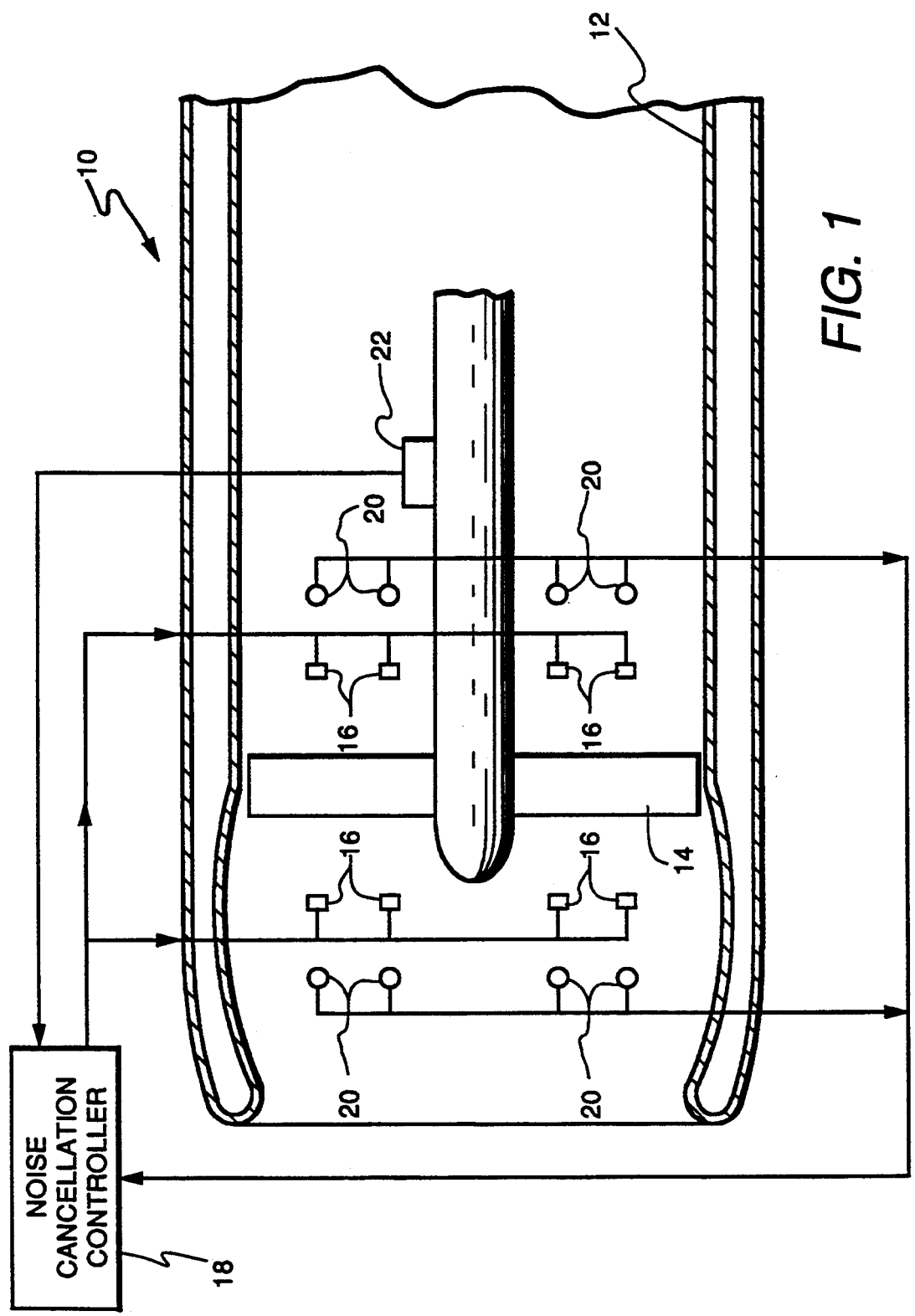
FIG. 1 shows a schematic, cross-sectional view of an aircraft engine incorporating the active noise cancellation system of the present invention.

Referring to the drawings wherein identical reference numerals denote the same elements throughout the various views, Figure I schematically shows the active noise cancellation system of the present invention as implemented in an aircraft engine 10. The engine 10, which in itself does not form a part of the present invention, can be any typical turbine- or fan-driven aircraft engine. The engine 10 includes an outer shroud 12 and a fan 14. For the sake of clarity, the other parts of the engine 10 are not shown.

In the present invention, noise sources 16 are provided to generate a secondary or cancelling noise field which destructively interferes with the primary noise field of the engine 10. FIG. 1 schematically shows a plurality of noise sources 16 mounted in the inner surface of the engine shroud 12. The size of the noise'-sources 16 depends on the acoustic power required to produce the secondary sound field. The number and placement of the noise sources 16 depends mainly on the modal order of the primary noise field to be cancelled. Ideally, a number of noise sources 16 will be distributed around the periphery of the engine shroud 12 in a cross-sectional plane to define a "ring source." One or more ring sources may be located both upstream and downstream of the fan 14. A plurality of ring sources, each designed for a different noise bandwidth, can be used for cancellation of multiple tones.

The noise sources 16 are controlled by a noise cancellation controller 18 connected to each of the noise sources. The controller 18 receives input from a plurality of noise transducers 20 and a tachometer 22. The transducers 20 sense noise generated by the engine 10 and produce an error signal corresponding to the level of noise sensed. The noise transducers 20 can be microphones, piezoelectric transducers or any other type of device capable of sensing noise and producing an electrical signal output thereof. The transducers 20 are generally located near to wherever noise is believed to emanate from. Preferably, an array of noise transducers 20 is located upstream of the fan 14 and another array is located downstream of the fan 14, as shown in FIG. 1. The tachometer 22 inputs the blade passage frequency of the fan 14 into the controller 18. In response to the inputs from the noise transducers 20 and the tachometer 22, the controller 18 determines an appropriate control signal which is sent to each of the noise sources 16. The control signal causes the noise sources 16 to vibrate with the frequency and amplitude needed to create the proper secondary noise field for minimizing total noise.

The controller 18 can be implemented using one of a variety of standard control schemes known in the art. One preferred scheme uses a multi-input, multi-output (MI/MO) adaptive filtering approach based on the MI/MO Filtered-X LMS algorithm. Such an algorithm is described in the article "A Multiple Error LMS Algorithm and its Application to the Active Control of Sound and Vibration," *IEEE Transactions on Acoustic Speech and Signal Processing*, Vol. ASSP-35, No. 10, October, 1987, by Stephen Elliott et al. In such a control scheme, the control signals which are sent to the noise sources 16 are adjusted in real time to minimize noise at the noise transducers 20. The controller 18 can react nearly instantly to any change in the RPM of the fan 14. Moreover, due to its adaptive nature, the controller 18 is self-configuring and can self-adapt to changes in the system such as noise source or transducer failure.

Figure 2:
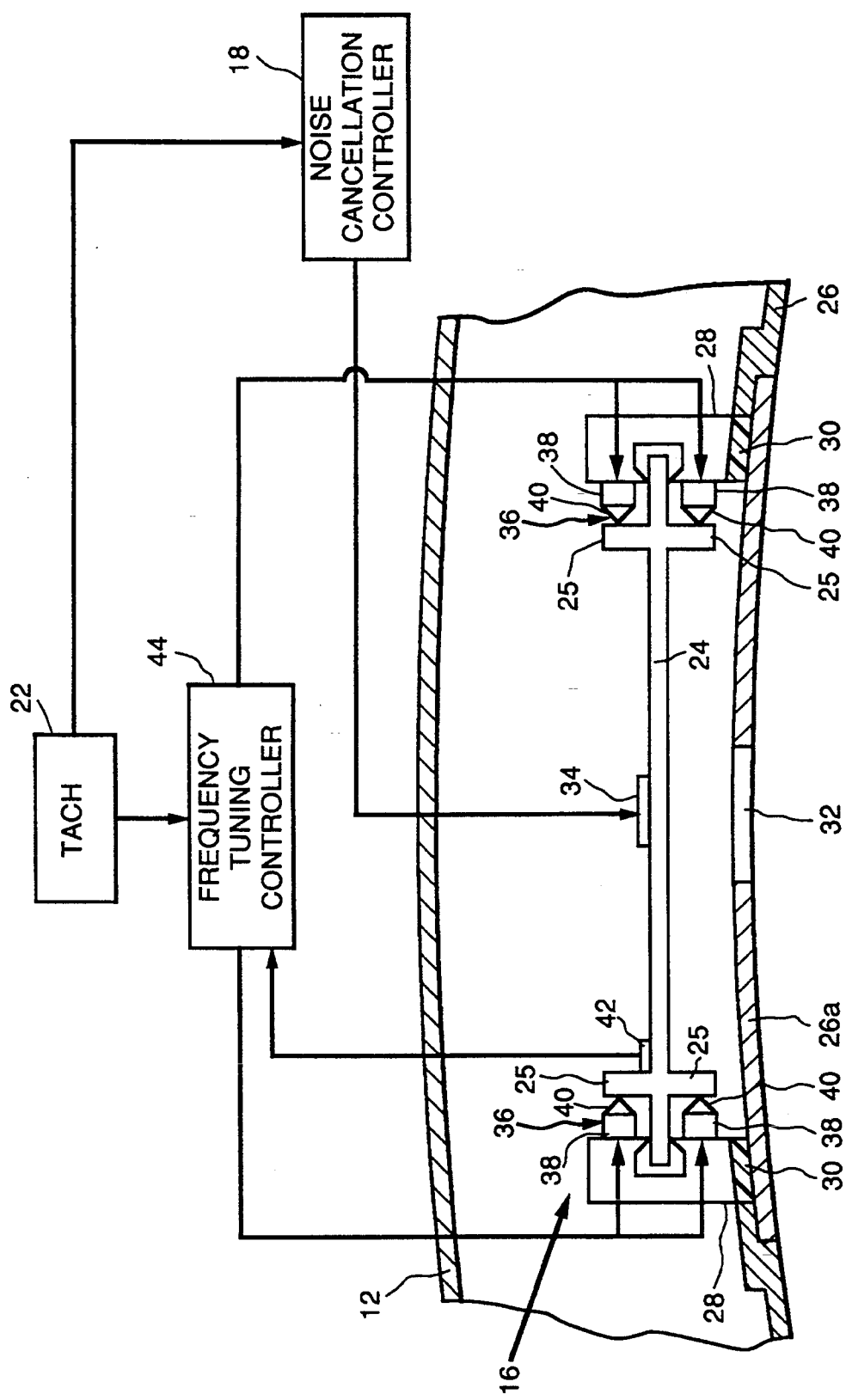
FIG. 2 is a partial, cross-sectional end view showing a first embodiment of the noise source of the present invention in detail.

Turning to FIG. 2, a first embodiment of a noise source 16 is shown in detail. The noise source 16 comprises a noise radiating element 24 which is a relatively thin panel of a lightly damped material such as aluminum mounted to the inner wall 26 of the shroud 12 by a number of clamps 28. While two clamps 28 are shown in FIG. 2, any reasonable number of clamps can be employed. For instance, clamps can be disposed all around the periphery of the noise radiating element 24. The noise radiating element 24 has a plurality of flanges 25 protruding therefrom. The flanges 25 are arranged so that, in the vicinity of each clamp 28, a flange 25 extends perpendicularly from each side of the noise radiating element 24. Therefore, two flanges 25 are positioned adjacent to the front side of each clamp 28, on opposite sides of the noise radiating element 24.

The clamps 28 are attached to a portion 26a of the inner wall 26 by resilient mounting members 30; the inner wall portion 26a is flush with the inner wall 26 and may be a separate plate removably attached to the inner wall 26 in order to permit access to the noise source 16. The resilient mounting members 30 are preferably elastic members disposed between the clamps 28 and the inner wall portion 26a which prevent noise generating vibrations of the noise source 16 from propagating to the critical parts of the engine 10. The clamps 28 extend from the inner wall portion 26a into the hollow interior of the engine shroud 12 so that the noise source 16 is not in the main flow of the engine 10. This arrangement assures that the noise controlling structure does not interfere with engine performance. A sound port 32 is formed in the inner wall portion 26a to permit the cancelling noise field generated by the noise source 16 to be transmitted into the engine interior. The sound port 32 is preferably covered with a mesh or similar structure to prevent ingress of foreign materials.

The clamps 28 support the noise radiating element 24 in a manner which permits the noise radiating element 24 to vibrate. Vibration of the noise radiating element 24 is produced by an actuator 34 which is connected to the noise cancellation controller 18. The actuator 34 is preferably a thin sheet of piezoceramic, electrostrictive or magnetostrictive material disposed flat on the noise radiating element 24. The thin sheet exerts an oscillating force in the plane of the noise radiating element 24 when excited by the control signal sent from the controller 18. Structure-borne noise is then generated when in-plane vibrations change the shape of the noise radiating element 24 and produce bending motions. The highest, and thus most effective, acoustic output is achieved when the noise radiating element 24 is vibrated at one of its natural resonant frequencies.

In the present invention, the resonant frequency of the noise radiating element 24 is adaptively tuned by changing its boundary conditions, thereby providing effective noise cancellation over a wider frequency range. To this end, each clamp 28 is provided with a pair of force transmitting mechanisms 36, one disposed above the position where the noise radiating element 24 is clamped and one below. Each of the force transmitting mechanisms 36 comprises an expandable element 38 attached to the front side of the clamp 28 and a spring 40 attached to the element 38. The elements 38 can comprise piezoceramic, electrostrictive or magnetostrictive materials or can comprise an electromechanical device. Each spring 40 engages a respective one of the flanges 25 extending from the noise radiating element 24. The force transmitting mechanisms 36 are thus able to apply variable spring forces to the noise radiating element 24 via the flanges 25. The spring forces act perpendicularly on the flanges 25 to create a bending moment in the noise radiating element 24. Varying the spring forces will vary the linear stiffness of the combined controller/support system, thereby changing the resonant frequency of the whole system.

A feedback sensor 42 is disposed on the noise radiating element 24. The feedback sensor 42 can be any type of device which produces a signal that is proportional to the displacement (as well as the velocity or acceleration) of the noise radiating element 24. Suitable devices include an accelerometer, a strain gauge or a patch of piezoceramic material. The feedback signal produced by the feedback sensor 42 is fed to a frequency tuning controller 44. The tuning controller 44 also receives input of the blade passage frequency from the tachometer 22. In response to these inputs, the controller 44 determines appropriate control signals which are sent to the elements 38 of the force transmitting mechanisms 36. The tuning controller 44 is implemented using a control scheme in which the gain is adjusted in accordance with the inputted blade passage frequency.

In operation, the control signals applied to the elements 38 cause appropriate displacements in the elements 38. These displacements alter the forces exerted by the springs 40 on the flanges 25, thereby changing the bending stiffness of the noise radiating element 24. This tunes the resonant frequency of the noise radiating element 24 so that it tracks the blade passage frequency of the fan 14. The noise cancellation controller 18 then sends control signals to the actuator 34 which cause the noise radiating element 24 to vibrate at resonance and generate a noise field which tends to cancel the primary field produced by the engine 10.

Figure 3:
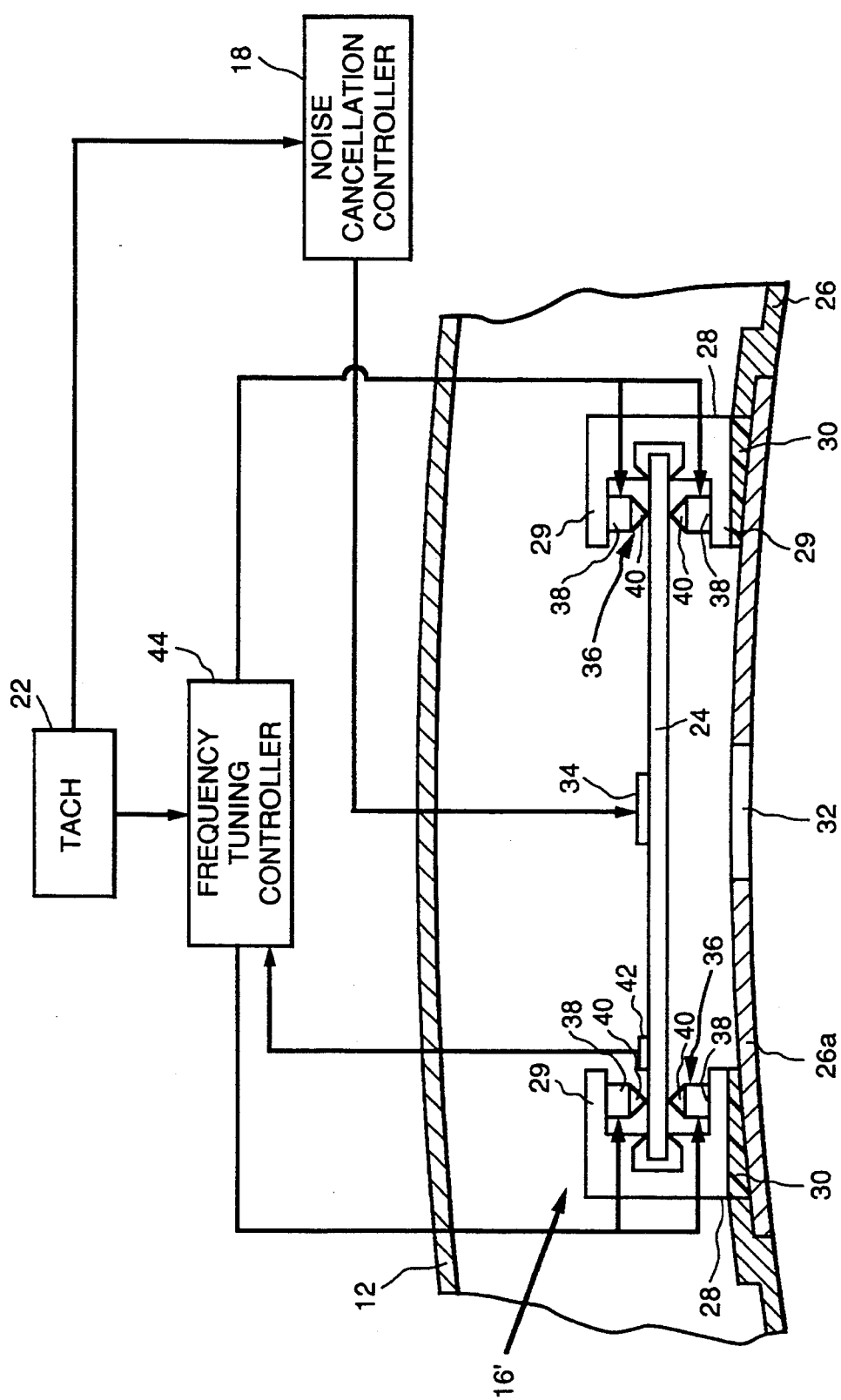
FIG. 3 is a partial, cross-sectional end view showing a second embodiment of the noise source of the present invention in detail.

Turning to FIG. 3, a second embodiment of the present invention is shown. FIG. 3 shows a noise source 16' which tunes the resonant frequency by changing the linear stiffness of a noise radiating element 24. The noise source 16' is the same as the noise source 16 of FIG. 2 except that the noise radiating element 24 does not have perpendicularly extending flanges and the arrangement of the clamps 28 and the force transmitting mechanisms 36 is altered. Specifically, each clamp 28 is provided with a pair of abutments 29 extending parallel to the noise radiating element 24, one above the noise radiating element 24 and one below. A force transmitting mechanism 36 is disposed on each abutment 29, facing the noise radiating element 24. Each force transmitting mechanism 36 comprises an expandable element 38 attached to one of the abutments 29 and a spring 40 attached to the element 38. The elements 38 can comprise piezoceramic, electrostrictive or magnetostrictive materials or can comprise an electromechanical device. Each of the springs 40 engages a respective one of the opposing surfaces of the noise radiating element 24. The force transmitting mechanisms 36 are thus able to directly apply variable spring forces to the noise radiating element 24. Varying the spring forces will vary the linear stiffness of the combined controller/support system, thereby changing the resonant frequency of the whole system.

The remaining elements of the second embodiment are the same as those in the first embodiment and function in the same manner. Thus, the feedback sensor 42 is disposed on the noise radiating element 24 and sends a feedback signal to the tuning controller 44. In response to the feedback signal and the blade passage frequency input from the tachometer 22, the controller 44 determines appropriate control signals which are sent to the elements 38 of the force transmitting mechanisms 36. The control signals cause appropriate displacements in the elements 38. These displacements alter the forces exerted by the springs 40 on the noise radiating element 24, thereby changing the stiffness of the overall mechanism, including the noise radiating element 24. This tunes the resonant frequency of the noise radiating element 24 so that it tracks the blade passage frequency of the fan 14. The noise cancellation controller 18 then sends control signals to the actuator 34 which cause the noise radiating element 24 to vibrate at resonance and generate a noise field which tends to cancel the primary field produced by the engine 10.

The foregoing has described an active noise control system in which the cancelling noise is generated through vibrational inputs to noise radiating elements which have adaptively changing boundary conditions to allow adaptive tuning of the resonant frequency of the noise radiating elements for maximum efficiency. Although the present invention has been described primarily for use with an aircraft engine, the invention can be used in almost any device where high-order acoustic modes propagating down a waveguide are to be eliminated. Examples of such devices include heat, ventilation, and air conditioning (HVAC) systems and turbine devices.

While specific embodiments of the present invention have been described, it will be apparent to those skilled in the art that various modifications thereto can be made without departing from the spirit and scope of the invention as defined in the appended claims.

What is claimed is:

1. A noise source for use in an active noise cancellation system which minimizes noise emanating from an aircraft engine having an outer shroud and a fan, said noise source comprising:

a noise radiating element mounted to said outer shroud;

means for applying a variable force to said noise radiating element;

a sensor disposed on said noise radiating element, said sensor producing a feedback signal proportional to displacement of said noise radiating element;

means for producing a blade passage frequency signal corresponding to the blade passage frequency of said fan; and a controller having an input connected to said sensor, another input connected to said means for producing a blade passage frequency signal, and an output connected to said means for applying a variable force, said controller being responsive to said feedback signal and said blade passage frequency signal to determine a control signal which is sent to said means for applying a variable force, said control signal causing said means for applying a variable force to vary the force applied to said noise radiating element.

2. The noise source of claim 1 wherein said means for applying a variable force comprises a force transmitting mechanism arranged in contact with said noise radiating element.

3. The noise source of claim 2 wherein said force transmitting mechanism comprises an expandable element which is excited by said control signal and a spring which contacts said noise radiating element.

4. The noise source of claim 1 further comprising at least two clamps which support said noise radiating element on said outer shroud.

5. The noise source of claim 4 wherein said noise radiating element includes a plurality of flanges extending therefrom so that two of said flanges are adjacent to each one of said clamps.

6. The noise source of claim 5 wherein said means for applying a variable force comprises a force transmitting mechanism associated with each one of said flanges.

7. The noise source of claim 6 wherein each one of said force transmitting mechanisms comprises an expandable element contacting one of said clamps and a spring contacting one of said flanges.

8. The noise source of claim 4 wherein said means for applying a variable force comprises two force transmitting mechanisms associated with each one of said clamps.

9. The noise source of claim 8 wherein each one of said force transmitting mechanisms comprises an expandable element contacting one of said clamps and a spring contacting one side of said noise radiating element.

10. The noise source of claim 4 wherein said clamps are resiliently mounted to said outer shroud.

11. The noise source of claim 1 further comprising an actuator disposed on said noise radiating element.

12. An apparatus for minimizing noise emanating from an aircraft engine which has an outer shroud and a fan, said apparatus comprising:

a noise radiating element mounted to said outer shroud;

means for applying a variable force to said noise radiating element;

a sensor disposed on said noise radiating element, said sensor producing a feedback signal proportional to displacement of said noise radiating element;

means for producing a blade passage frequency signal corresponding to the blade passage frequency of said fan;

a frequency tuning controller having an input connected to said sensor, another input connected to said means for producing a blade passage frequency signal, and an output connected to said means for applying a variable force, said frequency tuning controller being responsive to said feedback signal and said blade passage frequency signal to determine a frequency control signal which is sent to said means for applying a variable force, said frequency control signal causing said means for applying a variable force to vary the force applied to said noise radiating element;

means for sensing noise generated by said engine, said means for sensing noise producing an error signal corresponding to the level of noise sensed; and a noise cancellation controller having an input connected to said means for sensing noise, another input connected to said means for producing a blade passage frequency signal, and an output connected to said noise radiating element, said noise cancellation controller being responsive to said error signal and said blade passage frequency signal to determine a noise control signal which is sent to said noise radiating element, said noise control signal causing said noise radiating element to generate a noise field which minimizes the total noise emanating from said engine.

13. The apparatus of claim 12 wherein said means for applying a variable force comprises a force transmitting mechanism arranged in contact with said noise radiating element.

14. The apparatus of claim 13 wherein said force transmitting mechanism comprises an expandable element which is excited by said control signal and a spring which contacts said noise radiating element.

15. The apparatus of claim 12 further comprising at least two clamps which support said noise radiating element on said outer shroud.

16. The apparatus of claim 15 wherein said noise radiating element includes a plurality of flanges extending therefrom so that two of said flanges are adjacent to each one of said clamps.

17. The apparatus of claim 16 wherein said means for applying a variable force comprises a force transmitting mechanism associated with each one of said flanges.

18. The apparatus of claim 17 wherein each one of said force transmitting mechanisms comprises an expandable element contacting one of said clamps and a spring contacting one of said flanges.

19. The apparatus of claim 15 wherein said means for applying a variable force comprises two force transmitting mechanisms associated with each one of said clamps.

20. The apparatus of claim 19 wherein each one of said force transmitting mechanisms comprises an expandable element contacting one of said clamps and a spring contacting one side of said noise radiating element.

21. The apparatus of claim 15 wherein said clamps are resiliently mounted to said outer shroud.

22. The apparatus of claim 12 wherein said noise radiating element is disposed inside of said outer shroud near a sound port formed in said outer shroud.

23. The apparatus of claim 12 further comprising an actuator disposed on said noise radiating element.

24. A method for adjusting the resonant frequency of a noise radiating element used in an active noise cancellation system which minimizes noise emanating from an aircraft engine having an outer shroud and a fan, said method comprising the steps of:

sensing the displacement of said noise radiating element;

sensing the blade passage frequency of said fan; and adjusting the stiffness of the noise radiating element in accordance with the displacement of said noise radiating element and the blade passage frequency of said fan.

25. The method of claim 24 wherein said step of adjusting the stiffness of the noise radiating element comprises varying a bending moment applied to said noise radiating element.

26. The method of claim 24 wherein said step of adjusting the stiffness of the noise radiating element comprises varying a linear force applied to said noise radiating element.

* * * * *